(12) United States Patent
Dusterhoft et al.

(10) Patent No.: US 8,418,764 B2
(45) Date of Patent: *Apr. 16, 2013

(54) METHODS USEFUL FOR CONTROLLING FLUID LOSS IN SUBTERRANEAN FORMATIONS

(75) Inventors: Ronald G. Dusterhoft, Katy, TX (US); Bradley L. Todd, Duncan, OK (US); David W. Ritter, Katy, TX (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,185

(22) Filed: Nov. 9, 2011

(65) Prior Publication Data

US 2012/0048550 A1 Mar. 1, 2012

Related U.S. Application Data

(63) Continuation of application No. 11/360,215, filed on Feb. 22, 2006, now Pat. No. 8,091,638, which is a continuation-in-part of application No. 11/102,062, filed on Apr. 8, 2005, which is a continuation-in-part of application No. 10/881,198, filed on Jun. 29, 2004, now Pat. No. 7,117,942, which is a continuation-in-part of application No. 10/760,443, filed on Jan. 20, 2004, now Pat. No. 7,759,292, which is a continuation-in-part of application No. 10/612,271, filed on Jul. 2, 2003, now Pat. No. 7,182,136, which is a continuation-in-part of application No. 10/440,337, filed on May 16, 2003, now abandoned.

(51) Int. Cl.
*E21B 43/22* (2006.01)
*E21B 43/04* (2006.01)
*E21B 43/26* (2006.01)

(52) U.S. Cl.
USPC .................... 166/305.1; 166/278; 166/282

(58) Field of Classification Search ........................ None
See application file for complete search history.

(56) References Cited

U.S. PATENT DOCUMENTS

| 4,152,274 | A | | 5/1979 | Phillips et al. |
| 4,460,627 | A | * | 7/1984 | Weaver et al. ................. 427/212 |
| 4,625,802 | A | | 12/1986 | Sydansk |
| 5,482,116 | A | * | 1/1996 | El-Rabaa et al. ........... 166/250.1 |
| 6,476,169 | B1 | | 11/2002 | Eoff et al. |
| 7,117,942 | B2 | * | 10/2006 | Dalrymple et al. ............ 166/278 |
| 7,632,787 | B2 | * | 12/2009 | Mirakyan et al. .............. 507/211 |
| 8,091,638 | B2 | | 1/2012 | Dusterhoft et al. |
| 2004/0209780 | A1 | | 10/2004 | Harris et al. |

FOREIGN PATENT DOCUMENTS

| EP | 1 193 365 A1 | | 4/2002 |
| EP | 1193365 | * | 4/2002 |

* cited by examiner

*Primary Examiner* — Angela M DiTrani

(74) *Attorney, Agent, or Firm* — Robert A. Kent; McDermott Will & Emery LLP

(57) ABSTRACT

Methods of reducing the permeability of a subterranean formation to aqueous-based fluids using a water-soluble relative permeability modifier that comprises a reaction product of a hydrophilic compound and a hydrophilic polymer. In some methods the hydrophilic polymer may be selected from the group consisting of: a polyacrylamide, a polyvinylamine, a poly(vinylamine/vinyl alcohol), an alkyl acrylate polymer, and a combination thereof. In other methods the hydrophilic polymer may be selected from the group consisting of: a polyvinylamine; a poly(vinylamine/vinyl alcohol); a cellulose; a chitosan; a polyamide; a polyetheramine; a polyethyleneimine; a polyhydroxyetheramine; a polylysine; a polysulfone; a gum; a starch, and a combination thereof.

16 Claims, 7 Drawing Sheets

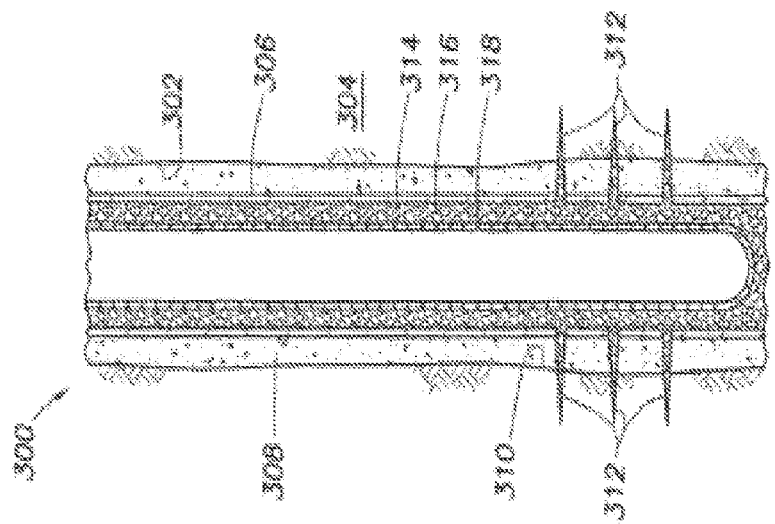
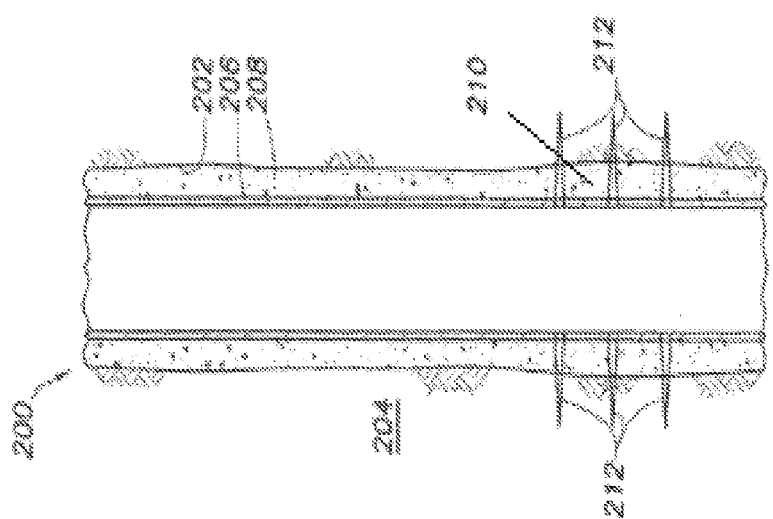
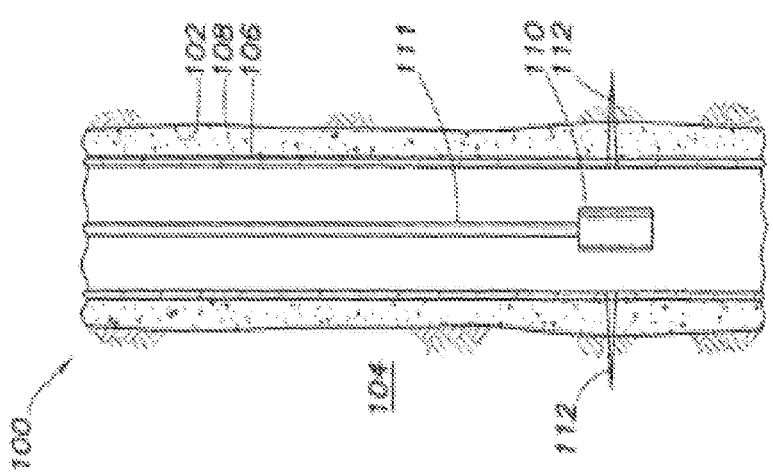

METHODS USEFUL FOR CONTROLLING FLUID LOSS IN SUBTERRANEAN FORMATIONS

CROSS-REFERENCE TO RELATED APPLICATIONS

This application is a continuation of U.S. patent application Ser. No. 11/360,215 filed on Feb. 22, 2006 and issued as U.S. Pat. No. 8,091,638, entitled "Methods Useful for Controlling Fluid Loss in Subterranean Formations," by Ronald G. Dusterhoft, et al., which was itself a continuation-in-part of U.S. patent application Ser. No. 11/102,062 filed on Apr. 8, 2005 (U.S. Pub. No. 2005/0199396), the entire disclosure of which is hereby incorporated by reference; which was itself a continuation-in-part of U.S. patent application Ser. No. 10/881,198 filed on Jun. 29, 2004 and issued as U.S. Pat. No. 7,117,942, the entire disclosure of which is hereby incorporated by reference; which was itself a continuation-in-part of U.S. patent application Ser. No. 10/760,443 filed on Jan. 20, 2004 and issued as U.S. Pat. No. 7,759,292, the entire disclosure of which is hereby incorporated by reference; which was itself a continuation-in-part of U.S. patent application Ser. No. 10/612,271 filed on Jul. 2, 2003 and issued as U.S. Pat. No. 7,182,136, the entire disclosure of which is hereby incorporated by reference; which was itself a continuation-in-part of U.S. patent application Ser. No. 10/440,337 filed on May 16, 2003 and now abandoned (U.S. Pub. No. 2004/0229756), the entire disclosure of which is hereby incorporated by reference.

BACKGROUND

The present invention relates to fluid loss control and, more particularly, to using fluid loss control additives that comprise a water-soluble polymer having hydrophobic or hydrophilic modification.

A problem often encountered during subterranean treatments is the undesired loss or leak off of fluid into the formation. This undesired loss or leak off is commonly referred to as "fluid loss." Fluid loss can occur in drilling operations, cleanup operations, workover operations, completion operations, stimulation treatments (e.g., fracturing, acidizing), and sand control treatments (e.g., gravel packing). In fracturing treatments, fluid loss into the formation may result in a reduction in fluid efficiency, such that the fracturing fluid cannot propagate the fracture as desired. As used herein, the term "treatment," or "treating," refers to any subterranean treatment that uses a fluid in conjunction with a desired function and/or for a desired purpose. The term "treatment," or "treating," does not imply any particular action by the fluid or any particular component thereof.

Fluid loss into the formation may result from a number of downhole conditions, such as high-formation permeability, overbalance pressures, perforated or open-hole intervals in the well bore, and large differential pressures associated with differential segregation in wells completed in a multilayer reservoir. In some instances, the fluid loss may be into a low-pressure portion of the formation due to overbalance pressures, for example, where a well is completed in a multilayer reservoir.

Traditional methods of combating fluid loss may involve mechanical or chemical isolation of the portions of the subterranean formation into which fluid loss occurs. However, in certain subterranean treatments (e.g., workover operations), the mechanical completion itself may not allow for such isolation to occur. In some instances, the use of low-density fluids, such as hydrocarbon-based fluids or foamed fluids, may be used to combat fluid loss into the formation. However, in some instances, well conditions may not allow for the use of hydrocarbon-based fluids, for instance, due to the hydrostatic pressures associated with the hydrocarbon-based fluids. Furthermore, the use of foamed fluids may add undesired expense and complexity to the well bore cleanup operation, as well as additional safety considerations.

In other instances, to prevent fluid loss from occurring, fluid loss control additives commonly may be included in the treatment fluids. Examples of commonly used fluid loss control additives include, but are not limited to, gelling agents, such as hydroxyethylcellulose and xanthan. Additional fluid loss control may be provided by crosslinking the gelling agent or by including fluid loss control materials, such as sized solids (e.g., calcium carbonate), silica particles, oil-soluble resins, and degradable particles, in the treatment fluids. The fluid loss control materials may be used in combination with or separately from the conventional fluid loss control additives. These conventional methods commonly work at the well bore and/or formation face and if they invade the reservoir, formation damage may occur. Additionally, the use of crosslinked fluids may impact fracture geometry, for example, creating wider, shorter fractures. Further, the crosslinked fluids may form a filter cake, which may be detrimental to the production of reservoir fluids.

Chemical fluid loss control pills also may be used to combat fluid loss. Conventional chemical fluid loss control pills may be characterized as either solids-containing pills or solids-free pills. Examples of solids-containing pills include sized-salt pills and sized-carbonate pills. These solids-containing pills often are not optimized for the particular downhole hardware and conditions that may be encountered. For instance, the particle sizes of the solids may not be optimized for a particular application and, as a result, may increase the risk of invasion into the interior of the formation matrix, which may greatly increase the difficulty of removal by subsequent remedial treatments. Additionally, high-solids loading in the pills, in conjunction with the large volumes of these pills needed to control fluid losses, may greatly increase the complexity of subsequent cleanup. Furthermore, high loading of starches and biopolymers in the sized salt pills may add to the difficulty of cleanup either by flow back or remedial treatments. Solids-free fluid loss control pills commonly comprise hydrated polymer gels that may not be effective without some invasion into the formation matrix. These pills typically require large volumes to control fluid loss and remedial treatments to remove.

Once fluid loss control is no longer required, for example, after completing a treatment, remedial treatments may be required to remove the previously placed pills, for example, so that the wells may be placed into production. For example, a chemical breaker, such as an acid, oxidizer, or enzyme may be used to either dissolve the solids or reduce the viscosity of the pill. In many instances, however, use of a chemical breaker to remove the pill from inside the well bore and/or the formation matrix may be either ineffective or not a viable economic option. For example, due to production equipment in the well bore, uniform placement of the breaker into the portion of the formation treated with the pill may not be possible. Furthermore, the chemical breakers may be corrosive to downhole tools. Additionally, as the chemical breakers leak off into the formation, they may carry undissolved fines that may plug and/or damage the formation or may produce undesirable reactions with the formation.

SUMMARY

The present invention relates to fluid loss control and, more particularly, to using fluid loss control additives that comprise a water-soluble polymer having hydrophobic or hydrophilic modification.

An embodiment of the present invention is a method of controlling fluid loss in a subterranean formation comprising: providing a treatment fluid comprising an aqueous fluid and a fluid loss control additive comprising a water-soluble polymer having hydrophobic or hydrophilic modification; introducing the treatment fluid into an interval of a well bore penetrating the subterranean formation; creating one or more perforations in the interval of the well bore, wherein the perforations extend from the well bore and into the subterranean formation; and allowing the treatment fluid to contact a portion of the subterranean formation through the one or more perforations.

Another embodiment of the present invention is a method of a reducing fluid loss from a perforated interval of a well bore comprising: providing a treatment fluid comprising an aqueous fluid and a fluid loss control additive comprising a water-soluble polymer having hydrophobic or hydrophilic modification; introducing the treatment fluid into the perforated interval of the well bore so that the treatment fluid contacts a portion of a subterranean formation through one or more openings that extend from the perforated interval of the well bore into the subterranean formation.

Another embodiment of the present invention is a method of reducing fluid loss from a gravel packed interval of a well bore comprising: providing a treatment fluid comprising an aqueous fluid and a fluid loss control additive comprising a water-soluble polymer having hydrophobic or hydrophilic modification; introducing the treatment fluid into the gravel packed interval of the well bore, wherein a gravel pack is disposed in the gravel packed interval of the well bore, and wherein the treatment fluid contacts the gravel pack.

Other and further features and advantages of the present invention will be readily apparent to those skilled in the art upon a reading of the description of the preferred embodiments that follows.

BRIEF DESCRIPTION OF THE FIGURES

These figures illustrate certain aspects of some of the embodiments of the present invention, and should not be used to limit or define the invention.

FIG. 1 is a cross-sectional side view of a well bore illustrating one embodiment of the present invention.

FIG. 2 is a cross-sectional side view of a well bore illustrating a perforated interval in accordance with one embodiment of the present invention.

FIG. 3 is a cross-sectional side view of a well bore illustrating a gravel packed interval in accordance with one embodiment of the present invention.

DESCRIPTION OF PREFERRED EMBODIMENTS

Figure 4:
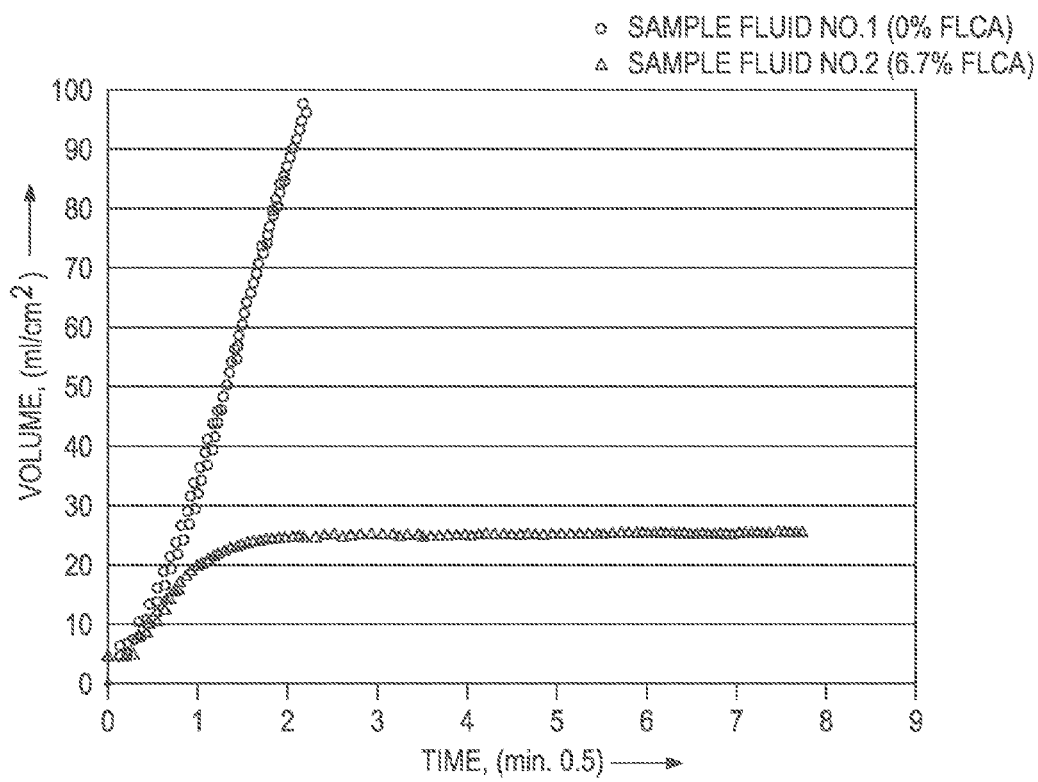
FIG. 4 is a plot of fluid loss volume per time for a dynamic fluid loss test performed using a round cell containing a H.P. Berea sandstone core and various sample fluids.

The present invention relates to subterranean treatments and, more particularly, to using fluid loss control additives that comprise a water-soluble polymer having hydrophobic or hydrophilic modification. As used herein, "water-soluble" refers to at least 0.01 weight percent soluble in distilled water. As used herein, the phrase "hydrophobically modified," or "hydrophobic modification," refers to the incorporation into the hydrophilic polymer structure of hydrophobic groups, wherein the alkyl chain length is from about 4 to about 22 carbons. As used herein, the phrase "hydrophilically modified," or "hydrophilic modification," refers to the incorporation into the hydrophilic polymer structure of hydrophilic groups, such as to introduce branching or to increase the degree of branching in the hydrophilic polymer. The methods and compositions of the present invention may be utilized in horizontal, vertical, inclined, or otherwise formed portions of wells.

The treatment fluids of the present invention generally comprise an aqueous fluid and a fluid loss control additive that comprises a water-soluble polymer having hydrophobic or hydrophilic modification. A variety of additional additives suitable for use in the chosen treatment may be included in the treatment fluids as desired. The aqueous fluid of the treatment fluids of the present invention may include freshwater, saltwater, brine (e.g., saturated saltwater), or seawater. Generally, the aqueous fluid may be from any source, provided that it does not contain components that may adversely affect other components in the treatment fluid.

Generally, the fluid loss control additives used in the treatment fluids of the present invention comprise a water-soluble polymer having hydrophobic or hydrophilic modification. A water-soluble polymer with hydrophobic modification is referred to herein as "hydrophobically modified." A water-soluble polymer with hydrophilic modification is referred to herein as "hydrophilically modified." Among other things the fluid loss control additives should reduce fluid loss from the treatment fluid or any other aqueous fluids subsequently introduced into the well bore. It is believed that after contact with surfaces within the formation's flow paths, at least a portion of the water-soluble polymer should attach to the surfaces, thereby reducing the permeability of the subterranean formation to aqueous fluids without substantially changing its permeability to hydrocarbons.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized utilizing any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction comprises an amino methacrylate/alkylammonium methacrylate copolymer. A suitable dimethylaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may comprise a dimethylaminoethyl methacrylate/hexadecyl-dimethylammoniumethyl methacrylate bromide copolymer.

In another embodiment of the present invention, the fluid loss control additives of the present invention may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone that comprises polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized utilizing any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of the fluid loss control additives of the present invention should be present in the treatment fluids of the present invention to provide the desired level of fluid loss control. In some embodiments, the fluid loss control additives should be present in the treatment fluids of the present invention in an amount in the range of from about 0.02% to about 10% by weight of the treatment fluid. In another embodiment, the fluid loss control additive should be present in the treatment fluids of the present invention in an amount in the range of from about 0.05% to about 1.0% by weight of the treatment fluid. In certain embodiments of the present invention, the fluid loss control additive may be provided in a concentrated aqueous solution prior to its combination with the other components necessary to form the treatment fluids of the present invention.

Additional additives may be added to the treatment fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, acids, conventional fluid loss control additives, viscosifying agents, crosslinking agents, gel breakers, shale swelling inhibitors, combinations thereof, and the like.

The treatment fluids of the present invention may be used in subterranean formations where it is desirable to provide fluid loss control. Generally, the fluid loss control additives may be used at any stage of a subterranean treatment. In certain embodiments, the treatment fluid may be a drilling fluid, a fracturing fluid, a workover fluid, a well bore cleanup fluid, a gravel packing fluid, or any other suitable aqueous fluid used in subterranean treatments. In another embodiment, the treatment fluids may be a fluid loss control pill that is introduced into the well bore at any stage of the subterranean treatment. For example, the treatment fluid may be a preflush that is introduced into the well bore prior to the subterranean treatment.

Generally, the methods of the present invention comprise introducing a treatment fluid of the present invention that comprises an aqueous fluid and a fluid loss control additive that comprises a water-soluble polymer having hydrophobic or hydrophilic modification into a well bore that penetrates a subterranean formation so as to reduce fluid loss into at least a portion of the subterranean formation from the treatment fluid or another aqueous fluid introduced into the well bore subsequent to the treatment fluid. Generally, at least a portion of the treatment fluid should penetrate into the porosity of at least a portion of the subterranean formation at least some depth from the treated surface. It is believed that the water-soluble polymer present in the portion of the treatment fluid in contact with formation should attach to surfaces within the porosity of the portion of the subterranean formation. The presence of the water-soluble polymers therein should reduce the permeability of the treated portion of the subterranean formation to aqueous fluids without substantially changing the permeability thereof to subsequently produced or injected hydrocarbon fluids. This should reduce fluid loss into the treated portion from the treatment fluid and/or any other aqueous fluids (e.g., workover fluids, completion fluids, cleanup fluids, fracturing fluids, gravel packing fluids, drilling fluids, etc.) subsequently introduced into the well bore. For example, the methods of the present invention may be useful to control fluid loss during subsequent entry and/or removal of completion equipment into the well bore. In addition, the water-soluble polymers also may reduce subsequent problems associated with water flowing into the well bore from the treated portion of the subterranean formation.

Among other things, subsequent remedial treatments should not be required to remove the water-soluble polymers prior to placing the well into production. If desired, however, oxidizers may be used to remove the water-soluble polymer. For example, it may be desired, in some instances, to remove the water-soluble polymers so that fluids subsequently introduced into the formation can enter the formation. Examples of suitable oxidizers include, but are not limited to, alkali, alkaline earth, and transition metal salts of periodate, hypochlorite, perbromate, chlorite, chlorate; hydrogen peroxide; manganese peroxide; peracetic acid; and combinations thereof.

Referring to FIG. 1, well 100 is illustrated. Well 100 comprises well bore 102 that penetrates subterranean formation 104. Even though FIG. 1 depicts well bore 102 as a vertical well bore, the methods of the present invention may be suitable for use in generally horizontal, generally vertical, or otherwise formed portions of wells. Casing 106 may be disposed in well bore 102, as shown in FIG. 1, or, in some embodiments, well bore 102 may be open hole. In some embodiments, casing 106 may extend from the ground surface (not shown) into well bore 102. In some embodiments, casing 106 may be connected to the ground surface (not shown) by intervening casing (not shown), such as surface casing and conductor pipe. Casing 106 may or may not be cemented to subterranean formation with cement sheath 108.

Perforating tool 110 in accordance with one embodiment of the present invention, is shown disposed in well bore 102 on tubing 111. Perforating tool 110 may be conveyed into well bore 102 using any suitable methodology. For example, perforating tool 110 may be conveyed into well bore on coiled tubing, jointed tubing, drill pipe, a slickline, an electric line, casing, and the like. In some embodiments, perforating tool 110 may be fixed in place at the bottom of well bore 102 with a gun hanger. As indicated in FIG. 1, perforating tool 110 may be positioned in well bore 102 so that it is adjacent to a portion of subterranean formation 104. Perforating tool 110 may be any suitable device used to perforate wells, including, but not limited to, perforating guns, laser perforating devices, chemical perforating devices, hydraulic jetting devices, or any other suitable device. Once perforating tool 110 has been positioned in well bore 102 at the location to be perforated, perforations 112 that communicate with subterranean formation 104 may be created using perforating tool 110. Any suitable method may be used to activate perforating tool 110. For example, perforating tool 110 may be activated by pressure, pressure pulsing, remote acoustic telemetry, mechanically, electronic signal, or any other suitable methodology. Perforations 112 extend from well bore 102 into the portion of subterranean formation 104 adjacent thereto. In the cased embodiments, as shown in FIG. 1, perforations 112 extend from well bore 102, through casing 106 and cement sheath 108, and into subterranean formation 104.

In accordance with the methods of the present invention, a treatment fluid of the present invention that comprise an aqueous fluid and a fluid loss control additive that comprise a water-soluble polymer having hydrophobic or hydrophilic modification may be introduced into the interval of well bore 102 to be perforated. The treatment fluid may be introduced into well bore 102 before or after perforating tool 110 has been positioned in well bore 102. In some embodiments, the treatment fluid may surround perforating tool 110 in well bore 102. The treatment fluid may be introduced into well bore 102 before or after perforations 112 have been created using perforating tool 110. Treatment fluid should contact subterranean formation 104 through perforations 112. It is believed that after contact with subterranean formation 104, the water-soluble polymer having hydrophobic or hydrophilic modification should attach to surfaces within the porosity of subterranean formation 104, thereby reducing the permeability of subterranean formation 104 to aqueous fluids without substantially changing its permeability to hydrocarbons. This reduction in permeability to aqueous fluid should reduce fluid loss from well bore 102 through perforations 112.

In some embodiments, the interval of well bore 102 may be underbalanced in that the pressure of the interval of well bore 102 to be perforated is less than the pressure in the portion of subterranean formation 104 adjacent thereto. A treatment fluid of the present invention may be introduced into the interval of well bore 102 to be perforated prior to or after the creation of perforations 112. After creation of perforations 112, well bore 102 may be put into an overbalanced condition so that the treatment fluid may contact subterranean formation 104 through perforations 112. In these underbalanced conditions, after creation of perforations 112, formation fluid may enter well bore 102 through perforations 112. In some embodiments, a treatment fluid of the present invention may be introduced into well bore 102 at a pressure sufficient to at least substantially displace the formation fluid from well bore 102.

In some embodiments, the interval of well bore 102 may be overbalanced in that the pressure of the interval of well bore 102 to be perforated exceeds the pressure in the portion of subterranean formation 104 adjacent thereto. In these overbalanced embodiments, after creation of perforations 112, the treatment fluid of the present invention should contact subterranean formation 104 through perforations 112. In these overbalanced embodiments, the treatment fluid of the present invention may be introduced into the interval of well bore 102 to be perforated prior to the creation of perforations 112.

In some overbalanced embodiments, extreme overbalanced perforating may be performed. Extreme overbalanced perforating involves increasing the pressure of well bore 102 inside casing 106 to a pressure much higher than the pressure in the portion of subterranean formation 104 adjacent thereto using a cushion of expandable gas in well bore 102, such as nitrogen. In these extreme overbalanced embodiments, after creation of perforations 112, the extreme pressure in well bore 102 results in a surge of fluid from well bore 102 into subterranean formation 104 through perforations 112 at a pressure sufficient to induce one or more small fractures in subterranean formation 104. These small fractures may be capable of bypassing near well bore damage. In the extreme overbalanced embodiments, the water-soluble polymer should control additional losses of fluid to subterranean formation 104 after the initial surge of the treatment fluid through perforations 112 to minimize longer term fluid loss into subterranean formation 104.

Another method suitable for achieving an extreme overbalanced condition in well bore 102 comprises the use of propellant sleeves comprising a propellant material on perforating tool 110. Where perforating tool 110 is a perforating gun, the propellant material may be ignited by the firing of perforating tool 110, and the combustion of this propellant material generates a localized pressure surged in well bore 102 generated by the combustions of gases released by the propellant material. Due to this pressure surge, there should be rapid fluid losses of the treatment fluid through perforations 112 into subterranean formation 104 allowing one or more fractures to form in subterranean formation that extend beyond any near well bore damage surrounding perforations 112. In these embodiments, the water-soluble polymer should control additional losses of fluid to subterranean formation 104 after the initial surface of the treatment fluid through perforations 112 to minimize longer term fluid loss into subterranean formation 104.

In some embodiments, the interval of well bore 102 may be balanced in that the pressure of the interval of well bore 102 to be perforated is about equal to the pressure in the portion of subterranean formation 104 adjacent thereto. In these balanced embodiments, after creation of perforations 112, the treatment fluid of the present invention should contact subterranean formation 104 through perforations 112. In these balanced embodiments, the treatment fluid of the present invention may be introduced into the interval of well bore 102 to be perforated prior to the creation of perforations 112.

In some overbalanced and balanced embodiments, immediately after creation of perforations 112, the pressure of the interval of well bore 102 that has been perforated is less than the pressure in the portion of subterranean formation 104 adjacent thereto. This is commonly referred to as "dynamic underbalance." The dynamic underbalance may be created using any suitable methodology, including the use of a chamber in the perforating tool. In these dynamic underbalanced embodiments, the underbalanced condition of well bore 102 is temporary. In these dynamic underbalanced conditions, formations fluid should enter well bore 102 after creation of perforations due to the underbalanced condition that has been created in well bore 102. In some embodiments, a treatment fluid of the present invention may have been introduced into the interval of well bore 102 to be perforated prior to the creation of perforations 118. Because the underbalanced condition of well bore 102 is temporary, once the overbalanced or balanced condition returns, the treatment fluid of the present invention should contact subterranean formation 104 through perforations 118.

Referring to FIG. 2, well 200 is illustrated. Well 200 contains well bore 202 that penetrates subterranean formation 204. Even though FIG. 2 depicts well bore 202 as a vertical well bore, the methods of the present invention may be suitable for use in generally horizontal, generally vertical, or otherwise formed portions of wells. Casing 206 may be disposed in well bore 202, as shown in FIG. 2, or, in some embodiments, well bore 202 may be open hole. In some embodiments, casing 206 may extend from the ground surface (not shown) into well bore 202. In some embodiments, casing 206 may be connected to the ground surface (not shown) by intervening casing (not shown), such as surface casing and conductor pipe. Casing 206 may or may not be cemented to subterranean formation with cement sheath 208.

Well bore 202 further contains perforated interval 210. Perforated interval 210 comprises perforations 212 in communication with subterranean formation 202. Perforations 212 extend from well bore 202 into the portion of subterranean formation 204 adjacent thereto. In the cased embodiments, as shown in FIG. 2, perforations 212 extend from well bore 202, through casing 206 and cement sheath 208, and into subterranean formation 204. While perforated interval 210 is depicted having perforations 212 therein, the term "perforated interval" as used herein refers to any portion of a well bore having one or more openings therein through which fluid may be lost into a subterranean formation. For example, in some embodiments, a perforated interval may contain one or more holes formed due to casing failure and/or casing wear.

In accordance with the methods of the present invention, a treatment fluid of the present invention comprising an aqueous fluid and a fluid loss control additive that comprises a water-soluble polymer having hydrophobic or hydrophilic modification may be introduced into perforated interval 210 of well bore 202. The treatment fluid should contact the portion of subterranean formation 204 adjacent to perforated interval 210 through perforations 212. It is believed that the water-soluble polymer having hydrophobic or hydrophilic modification should attach to surfaces within the porosity of subterranean formation 204, thereby reducing the permeability of subterranean formation 204 without substantially changing its permeability to hydrocarbons. This reduction in permeability to aqueous fluid should reduce fluid loss from the well bore 202 in perforated interval 210.

Referring to FIG. 3, well 300 is illustrated. Well 300 contains well bore 302 that penetrates subterranean formation 304. Even though FIG. 3 depicts well bore 302 as a vertical well bore, the methods of the present invention may be suitable for use in generally horizontal, generally vertical, or otherwise formed portions of wells. Casing 306 may be disposed in well bore 302, as shown in FIG. 3, or, in some embodiments, well bore 302 may be open hole. In some embodiments, casing 306 may extend from the ground surface (not shown) into well bore 302. In some embodiments, casing 306 may be connected to the ground surface (not shown) by intervening casing (not shown), such as surface casing and conductor pipe. Casing 306 may or may not be cemented to subterranean formation with cement sheath 308.

Well bore 302 further contains gravel packed interval 310. Gravel packed interval 310 contains perforations 312 in communication with subterranean formation 304. Perforations 312 extend from well bore 302 into the portion of subterranean formation 304 adjacent thereto. In the cased embodiments, as shown in FIG. 3, perforations 312 extend from well bore 302, through casing 306, and cement sheath 308, and into subterranean formation 304.

Sand control screen 314 is shown disposed in well bore 302. Annulus 316 is formed between sand control screen 314 and casing 306. Even though FIG. 3 depicts a sand control screen, the methods of the present invention may be used with a variety of suitable sand control equipment, including screens, liners (e.g., slotted liners, perforated liners, etc.), combinations of screens and liners, and any other suitable apparatus. Sand control screen 314 may be a wire-wrapped or expandable screen or any other suitable sand control screen. Gravel pack 318 is shown disposed in well bore 302. Gravel pack 318 comprises gravel particulates that have been packed in annulus 316 between sand control screen 314 and casing 306.

In accordance with the methods of the present invention a treatment fluid of the present invention that comprises an aqueous fluid and a fluid loss control additive that comprises a water-soluble polymer having hydrophobic or hydrophilic modification may be introduced into gravel packed interval 310 of well bore 302 so as to contact gravel pack 318. It is believed that the water-soluble polymer having hydrophobic or hydrophilic modification should attach to surfaces within gravel pack 318 in the gravel packed interval, thereby reducing the permeability of gravel pack 318 to aqueous fluids without substantially changing its permeability to hydrocarbons. This reduction in permeability to aqueous fluids should reduce fluid loss from well bore 302 through gravel pack 318.

To facilitate a better understanding of the present invention, the following examples of some of the preferred embodiments are given. In no way should the following examples be read to limit, or to define, the scope of the invention.

EXAMPLES

Example 1

A fluid loss control additive useful in the present invention was prepared by mixing 47.7 grams ("g") of deionized water, 0.38 g of (n-hexadecyl)dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane)dihydrochloride was added. The resulting solution was then heated, with stirring, to 112° F. and held for 18 hours to produce a highly viscous polymer solution.

Example 2

A fluid loss control additive useful in the present invention was prepared by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis(2-amidinopropane)dihydrochloride was added. The resulting solution was then heated, with stirring, to 112° F. and held for 18 hours to produce a highly viscous polymer solution.

Example 3

A fluid loss control additive useful in the present invention was prepared as follows. First, a polymer was prepared by mixing 1,968 g of deionized water, 105 g of dimethylaminoethyl methacrylate and sparging with nitrogen for 30 minutes. Thereafter, the pH was adjusted to approximately 7.9 with sulfuric acid and a polymerization initiator, such as 0.46 g of 2,2'-azo bis(2-amidinopropane)dihydrochloride was added. The resulting solution was then heated, with stirring, to 112° F. and held for 18 hours to produce poly(dimethylaminoethyl methacrylate).

The poly(dimethylaminoethyl methacrylate) was then hydrophobically modified by adding 71.0 g of it to a 250 ml round flask, followed by 15% NaOH to achieve a pH of approximately 8.9. Next, 54.6 g of water, 0.36 g of C16 alkyl(n-hexadecyl)bromide, and 0.39 g of benzylcetyldimethylammonium bromide surfactant were added to quaternize the poly(dimethylaminoethyl methacrylate) homopolymer and form a dimethylaminoethyl methacrylate/hexadecyl-dimethylammoniumethyl methacrylate copolymer. This mixture was then heated, with stirring, to 140° F. and held for 24 hours to produce a highly viscous polymer solution.

Example 4

Fluid loss control tests (Tests Nos. 1-2) were performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined as the "production direction," fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation. Two treatment solutions were prepared for this series of tests.

The sample treatment fluid used in Test No. 1 (comparative) was a brine containing 21% potassium chloride by weight. Test No. 1 was performed at room temperature.

The sample treatment fluid used in Test No. 2 was prepared by adding 0.2% of a fluid loss control additive by weight to a brine containing 21% potassium chloride by weight. Accordingly, the sample treatment fluid used in Test No. 2 comprised 21% of potassium chloride by weight and 0.2% of a fluid loss control additive by weight. The fluid loss control additive was a dimethylaminoethyl methacrylate/hexadecyl-dimethylammoniumethyl methacrylate copolymer prepared as described in Example 3. Test No. 2 was performed at room temperature.

The following procedure was used for this series of tests. For each test, the core experienced a flow sequence of 1) brine, 2) oil (kerosene), 3) drilling mud (to build a filter cake), 4) sample treatment fluid, 5) oil (kerosene). The first flow step, brine, was in the production direction and prepared the core for the test. The brine used in the first flow step was a brine containing 7% potassium chloride by weight. Next, in the second flow step, the kerosene was flowed in the production direction at a constant rate until the pressure stabilized, and the initial permeability of the core was calculated. Thereafter, in the third flow step, a sample drilling mud was placed in the hollow interior of the core and pressure was applied, such that a drilling fluid filter cake was formed on the inner surface of the core. After formation of the drilling fluid filter cake, the sample treatment fluid was placed in the inner hole, and a constant pressure of 120 psi was applied. The filtrate loss from the sample treatment fluid was then measured as a function of time. In the fifth flow step, kerosene was flowed in the production direction at the same rate and the final permeability of the core was calculated. For each series of tests, the initial and final permeability of the core to kerosene was essentially unchanged. Table 1 contains the data for this series of tests.

TABLE 1

| Test | Polymer Concentration | Filtrate Loss (ml) at Given Time (hours) | | | | | | | |
|---|---|---|---|---|---|---|---|---|---|
| | | 1 hr | 3 hrs | 5 hrs | 6.2 hrs | 7 hrs | 7.6 hrs | 7.9 hrs | 8.3 hrs |
| No. 1 @ room temperature | 0 | 1.7 | 2.3 | 3.2 | 3.6 | 10 | 31 | 50 | 80 |
| No. 2 @ room temperature | 2000 ppm | 1.7 | 2.3 | 3.2 | 3.6 | 3.9 | 4.1 | 4.3 | 4.4 |

Accordingly, this example indicates that the above-described fluid loss control additives that comprise hydrophobically modified polymers may be useful for controlling fluid loss from a well bore into a subterranean formation.

Example 5

Permeability reduction tests (Test Nos. 3-4) were performed using two treatment solutions and a multipressure tap Hassler sleeve containing a Brown sandstone core. The Hassler sleeve contained three pressure taps, as well as an inlet and an outlet for determining pressure, thereby dividing the core into four segments. Test No. 3 was performed at 150° F., and Test No. 4 was performed at 175° F.

The sample treatment fluid used in Test No. 3 was prepared by adding 0.6% of a fluid loss control additive by weight to a 2% by weight potassium chloride ("KCl") brine. Thus, the sample treatment fluid used in Test No. 3 comprised 2% of KCl by weight and 0.6% of a fluid loss control additive by weight. The fluid loss control additive was a dimethylaminoethyl methacrylate/hexadecyl-dimethylammoniumethyl methacrylate copolymer prepared as described in Example 3.

The sample treatment fluid used in Test No. 4 was prepared by adding 0.2% of a fluid loss control additive by weight to a 2% by weight KCl brine. Thus, the sample treatment fluid used in Test No. 4 comprised 2% of KCl by weight and 0.2% of a fluid loss control additive by weight. The fluid loss control additive was a dimethylaminoethyl methacrylate/hexadecyl-dimethylammoniumethyl methacrylate copolymer prepared as described in Example 3.

The following procedure was used for this series of tests. For each test, the core experienced a flow sequence of 1) brine, 2) oil (kerosene), 3) brine, 4) sample treatment fluid, 5) brine. The brine used in flow steps 1, 3, and 5 was a brine containing 7% potassium chloride by weight. The first two flow steps of brine and oil prepared the core for the test. The brine flow in step 3 was maintained until the pressure stabilized, yielding an initial permeability for the core, listed in Tables 2 and 3 below as "Initial Core Permeability." Next, 15 ml of the sample treatment fluid were flowed into the core. Next, the brine flow was reestablished until the pressure stabilized to determine the permeability of the core after treatment with the sample treatment fluid, listed in Tables 2 and 3 below as "Final Core Permeability." Initial and Final Core Permeabilities were utilized to determine a percent reduction of water permeability according to the following formula:

% Reduction of Water Permeability=(1−Final Permeability/Initial Permeability)×100

As previously discussed, the multipressure tap Hassler Sleeve divided the core into four segments. For the above-described tests, flow steps 1, 2, 3, and 5 were from segment 1 to segment 4, and flow step 4 was from segment 4 to segment 1. The results of Test No. 3 utilizing a polymer concentration of 6,000 ppm are provided in Table No. 2 below.

TABLE 2

| | Initial Core Permeability (mDarcy) | Final Core Permeability (mDarcy) | % Reduction of Water Permeability |
|---|---|---|---|
| Segment 1 | 371.7 | 328.59 | 12 |
| Segment 2 | 303.56 | 20.08 | 93 |
| Segment 3 | 358.92 | 30.27 | 92 |
| Segment 4 | 96.19 | 1.69 | 98 |
| Total | 241.46 | 8.36 | 97 |

The results of Test No. 4 utilizing a polymer concentration of 2,000 ppm are provided in Table No. 3 below.

TABLE 3

| | Initial Core Permeability (mDarcy) | Final Core Permeability (mDarcy) | % Reduction of Water Permeability |
|---|---|---|---|
| Segment 1 | 2,059.79 | 823.65 | 60 |
| Segment 2 | 4,372.98 | 1,784.29 | 59 |
| Segment 3 | 283.76 | 1.74 | 99 |
| Segment 4 | 5,281.94 | 4.81 | 100 |
| Total | 722.01 | 4.43 | 99 |

Accordingly, Example 5 indicates that the fluid loss control additives useful in the present invention that comprise hydrophobically modified polymers may be useful for controlling fluid loss from a well bore into a subterranean formation.

Example 6

A permeability reduction test (Test No. 5) was performed using two treatment solutions and a multipressure tap Hassler sleeve containing a Brown sandstone core. The Hassler sleeve contained three pressure taps, as well as an inlet and an outlet for determining pressure), thereby dividing the core into four segments.

The sample treatment fluid used in Test No. 5 was prepared by adding 0.2% of a fluid loss control additive by weight to a 2% by weight KCl brine. Thus, the sample treatment fluid used in Test No. 5 comprised 2% of KCl by weight and 0.2% of a fluid loss control additive by weight. The fluid loss control additive was a dimethylaminoethyl methacrylate/hexadecyl-dimethylammoniumethyl methacrylate copolymer prepared as described in Example 3. Test No. 5 was performed at 150° F.

The following procedure was used for this test. The core experienced a flow sequence of 1) brine, 2) oil (kerosene), 3) sample treatment fluid, 4) oil (kerosene). The first flow step of brine prepared the core for the test. The brine used in flow step 1 was a brine containing 7% KCl by weight. The oil flow in step 2 was maintained until the pressure stabilized, yielding an initial permeability for the core, listed in Tables 2 and 3 below as "Initial Core Permeability." Next, the sample treatment fluid was flowed into the core. Next, the oil flow was reestablished until the pressure stabilized to determine the permeability of the core after treatment with the sample treatment fluid, listed in Tables 2 and 3 below as "Final Core Permeability." Initial and Final Core Permeabilities were utilized to determine a percent reduction of oil permeability according to the following formula:

$$\% \text{ Reduction of Oil Permeability} = (1 - \text{Final Permeability}/\text{Initial Permeability}) \times 100$$

As previously discussed, the multipressure tap Hassler Sleeve divided the core into four segments. For the above-described tests, flow steps Nos. 1, 2, and 4 were from segment 1 to segment 4, and flow step No. 3 was from segment 4 to segment 1. The results of Test No. 5 utilizing a polymer concentration of 2,000 ppm are provided in Table No. 4 below.

TABLE 4

| | Initial Core Permeability (mDarcy) | Final Core Permeability (mDarcy) | % Reduction of Oil Permeability |
|---|---|---|---|
| Total | 3,571.5 | 4,725.25 | −32 |

Accordingly, this example indicates that the above-described fluid loss control additives that comprise hydrophobically modified polymers may not damage the permeability of hydrocarbon-bearing formations.

Example 7

A fluid loss control additive useful in the present invention was prepared as follows. First, a polymer was prepared by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis(2-amidinopropane) dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride and 14.7 g water.

Example 8

Dynamic fluid loss control tests (Test Nos. 6-11) were performed using four sample fluids and a round cell containing a formation core sample. High Pressure ("HP") Berea Sandstone, Low Pressure ("LP") Berea Sandstone, and Ohio Sandstone core samples were used for this series of tests.

The following procedure was used for this series of tests. The formation core samples were cut for a round core holder and placed into the core holder. The round core holder used a 1.5-inch diameter core. There was a 0.16-inch gap to allow fluid flow through the cell and across the core face for the dynamic test conditions. The round cells were heated to 140° F.

After the round cells were prepared, the sample fluid was pumped through 340 feet of 0.194-inch I.D. tubing to provide preconditioning and shear history for the fluid. The shear rate was approximately 440 sec$^{-1}$ at a pump rate of 0.31 l/min. After exiting this tubing, the sample fluid was pumped into a 0.402-inch I.D. tubing section (112 feet) that was immersed in a heating bath. This simulated the lower shear rate of fluid flow in a fracture. The shear rate was about 50 sec$^{-1}$. For this series of test, the sample fluid was heated to 140° F. as it flowed through this tubing section. After exiting this tubing section, the sample fluid was forced through the heated round cells where the dynamic fluid loss occurred. The gap for fluid flow in the round cell created the same shear rate (50 sec$^{-1}$) as in the previous tubing section. A 1,000-psi pressure differential drives fluid loss through the formation core sample. The fluid loss test was continued for the desired length of time while fluid loss volumes were collected.

Sample Fluid No. 1 (comparative) was a WATERFRAC™ 25 fluid system having a gelling agent concentration of 25 pounds per thousand gallons (lbs/mgal). WATERFRAC™ is a water-based fracturing fluid system that is commercially available from Halliburton Energy Services, Inc., Duncan, Okla. Sample Fluid No. 1 was prepared by adding 25 lbs/mgal of WG-22™ gelling agent to a base fluid. WG-22™ is a guar-based gelling agent that is commercially available from Halliburton Energy Services, Inc., Duncan, Okla. The base fluid was water that contained 2% KCl by weight. Sample Fluid No. 1 had a pH of 8.01. The viscosity of Sample Fluid No. 1 was found to be 17 cP at 74.1° F. on a FANN® Model 35 Viscometer ⅕ spring at 300 rpm.

Sample Fluid No. 2 was prepared by adding 67 gallons per thousand gallons (gal/mgal) of a fluid loss control additive to the WATERFRAC™ 25 fluid system of Sample Fluid No. 1. The fluid loss control additive was a dimethylaminoethyl methacrylate/hexadecyl-dimethylammoniumethyl methacrylate copolymer prepared as described in Example 3. Next, the sample was buffered to a pH of 6.09 using BA-20™ buffering agent. BA-20™ ammonium acetate— acetic acid-based buffering agent which is commercially available from Halliburton Energy Services, Inc., Duncan, Okla. The viscosity of Sample Fluid No. 2 was found to be 19.7 cP at 74.1° F. on a FANN® Model 35 Viscometer ⅕ spring at 300 rpm.

Sample Fluid No. 3 (comparative) was a DELTA FRAC® 140 25 fluid system having a gelling agent concentration of 25 lbs/mgal. DELTA FRAC® 140 25 is a borate-based fracturing fluid system that is commercially available from Halliburton Energy Services, Inc., Duncan, Okla. Sample No. 2 was prepared by adding 25 lbs/mgal of WG-22™ gelling agent to a base fluid. WG-22™ is a guar-based gelling agent that is commercially available from Halliburton Energy Services, Inc., Duncan, Okla. The base fluid was water that contained 2% KCl by weight. The base gel had a pH of 7.72. The viscosity of the base gel was found to be 16.1 cP at 72.3° F. on a FANN® Model 35 Viscometer ⅕ spring at 300 rpm. Next, 2 gals/mgal of BC-2 crosslinking agent was added to the base gel. BC-2 is a borate crosslinking agent that is commercially available from Halliburton Energy Services, Inc., Duncan, Okla. Next, 0.0017 gals/mgal of N-ZYME 3™ breaking agent was added to the base gel. N-ZYME 3™ is a glycerin-based breaking agent that is commercially available from Halliburton Energy Services, Inc., Duncan, Okla. The gelled and crosslinked Sample Fluid No. 3 had a pH of 8.55.

Sample Fluid No. 4 was prepared by adding 67 gal/mgal of a fluid loss control additive to the DELTA FRAC® 140 25 fluid system of Sample Fluid No. 3. The fluid loss control additive was a dimethylaminoethyl methacrylate/hexadecyl-dimethylammoniumethyl methacrylate copolymer prepared as described in Example 3. Sample Fluid No. 4 had a pH of 8.54. The viscosity of Sample Fluid No. 4 was found to be 16.2 cP at 74.1° F. on a FANN® Model 35 Viscometer ⅕spring at 300 rpm.

Dynamic fluid loss control tests (Test No. 6) were conducted in accordance with the above procedure using the H.P. Berea sandstone core sample for both Sample Fluid No. 1 and Sample Fluid No. 2. Table 5 below lists the total fluid loss volume after 4 minutes for each sample. The results of this test are also depicted in FIG. 4.

TABLE 5

H.P. BEREA SANDSTONE CORE

| Fluid | Fluid Loss Control Additive (gals/mgal) | Total Fluid Loss After 4 Minutes (ml/cm$^2$) |
|---|---|---|
| Sample Fluid No. 1 (WATERFRAC ™ 25 Fluid System) | 0 | 86.76 |
| Sample Fluid No. 2 (WATERFRAC ™ 25 Fluid System) | 67 | 24.69 |

Figure 5:
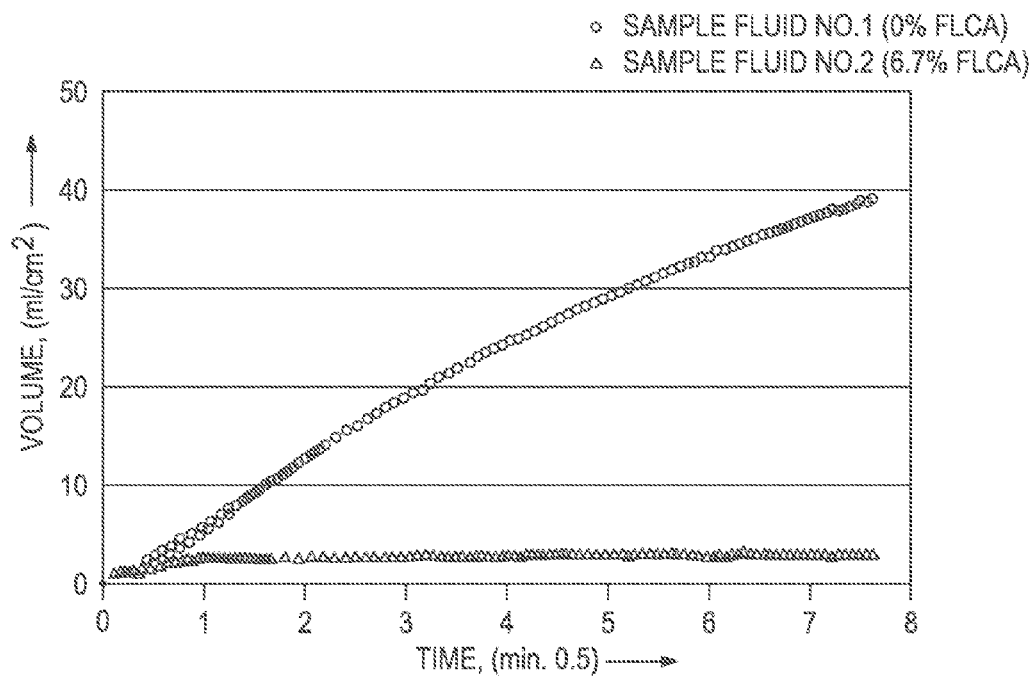
FIG. 5 is a plot of fluid loss volume per time for a dynamic fluid loss test performed using a round cell containing a L.P. Berea sandstone core and various sample fluids.

Dynamic fluid loss control tests (Test No. 7) were conducted in accordance with the above procedure using the L.P. Berea sandstone core samples for both Sample Fluid No. 1 and Sample Fluid No. 2. Table 6 below lists the total fluid loss volume after 1 hour for each sample. The results of this test are also depicted in FIG. 5.

TABLE 6

L.P. BEREA SANDSTONE CORE

| Fluid | Fluid Loss Control Additive (gals/mgal) | Total Fluid Loss After 1 Hour (ml/cm$^2$) |
|---|---|---|
| Sample Fluid No. 1 (WATERFRAC ™ 25 Fluid System) | 0 | 39.46 |
| Sample Fluid No. 2 (WATERFRAC ™ 25 Fluid System) | 67 | 3.42 |

Figure 6:
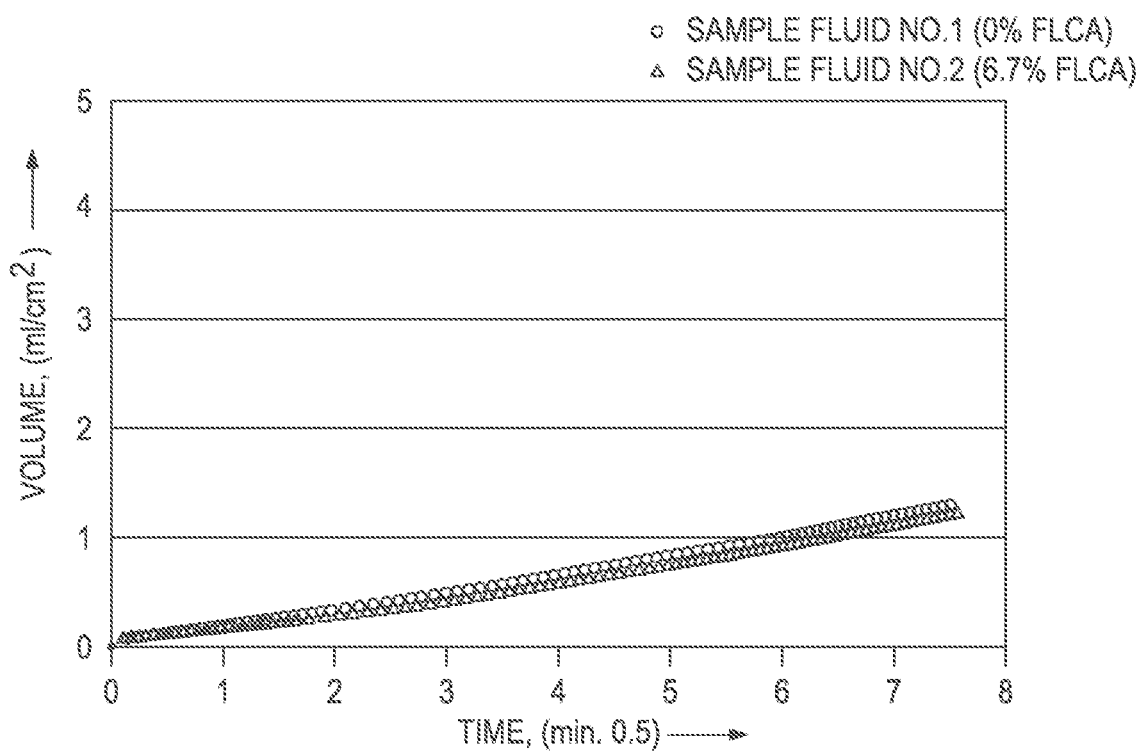
FIG. 6 is a plot of fluid loss volume per time for a dynamic fluid loss test performed using a round cell containing an Ohio sandstone core and various sample fluids.

Dynamic fluid loss control tests (Test No. 8) were conducted in accordance with the above procedure using the Ohio sandstone core sample for both Sample Fluid No. 1 and Sample Fluid No. 2. Table 7 below lists the total fluid loss volume after 1 hour for each sample. The results of this test are also depicted in FIG. 6.

TABLE 7

OHIO SANDSTONE CORE

| Fluid | Fluid Loss Control Additive (gals/mgal) | Total Fluid Loss After 1 Hour (ml/cm$^2$) |
|---|---|---|
| Sample Fluid No. 1 (WATERFRAC ™ 25 Fluid System) | 0 | 1.25 |
| Sample Fluid No. 2 (WATERFRAC ™ 25 Fluid System) | 67 | 1.18 |

Figure 7:
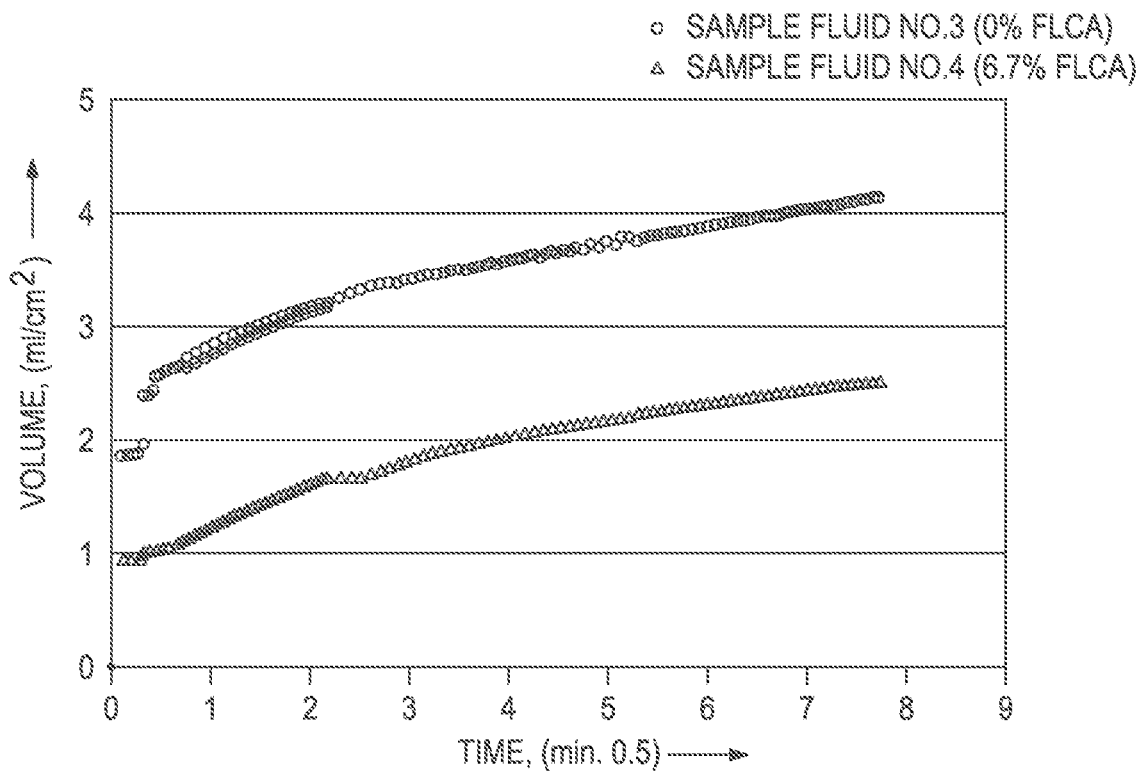
FIG. 7 is a plot of fluid loss volume per time for a dynamic fluid loss test performed using a round cell containing a H.P. Berea sandstone core and various sample fluids.

In addition to the above tests for Sample Fluid No. 1 and No. 2, dynamic fluid loss control tests (Test No. 9) were also conducted in accordance with the above procedure for Sample Fluid No. 3 and No. 4 on each of the formation core samples. First, the dynamic fluid loss tests were conducted using the H.P. Berea sandstone core sample. Table 8 below lists the total fluid loss volume after 1 hour for each sample. The results of this test are also depicted in FIG. 7.

TABLE 8

H.P. BEREA SANDSTONE CORE

| Fluid | Fluid Loss Control Additive (gals/mgal) | Total Fluid Loss After 1 Hour (ml/cm$^2$) |
|---|---|---|
| Sample Fluid No. 3 (DELTA FRAC ® 140 25 Fluid System) | 0 | 4.13 |
| Sample Fluid No. 4 (DELTA FRAC ® 140 25 Fluid System) | 67 | 2.51 |

Figure 8:
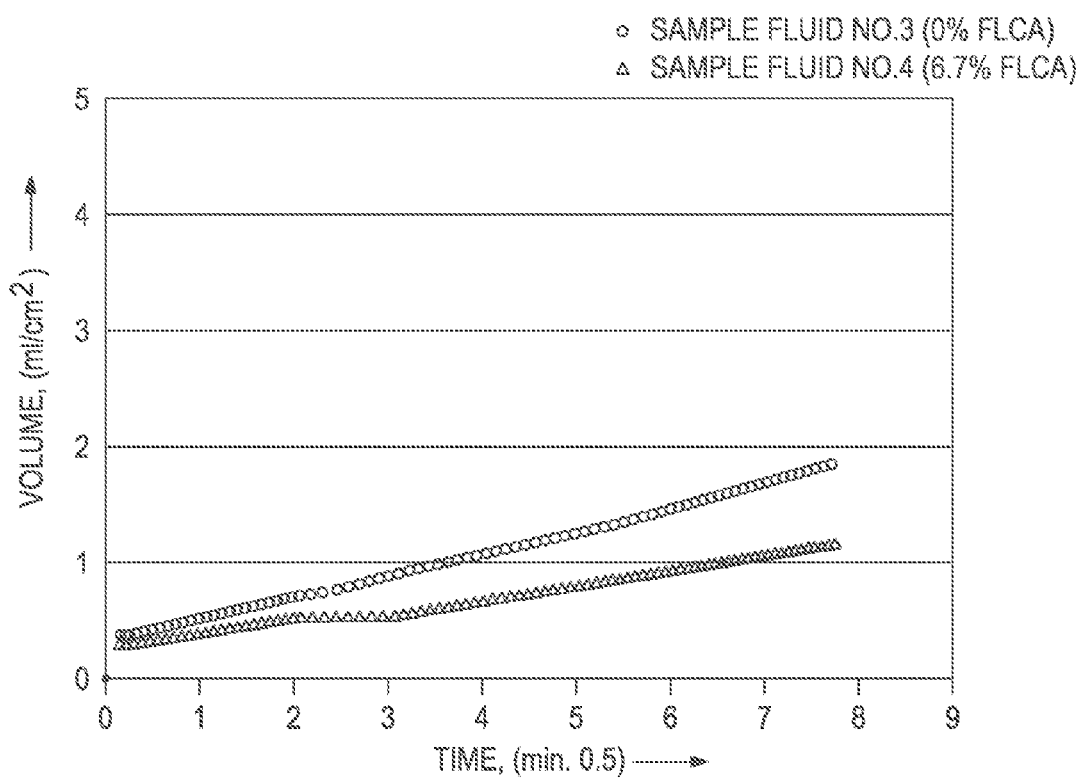
FIG. 8 is a plot of fluid loss volume per time for a dynamic fluid loss test performed using a round cell containing a L.P. Berea sandstone core and various sample fluids.

Dynamic fluid loss control tests (Test No. 10) were conducted in accordance with the above procedure using the L.P. Berea sandstone core samples for both Sample Fluid No. 3 and Sample Fluid No. 4. Table 9 below lists the total fluid loss volume after 1 hour for each sample. The results of this test are also depicted in FIG. 8.

TABLE 9

L.P. BEREA SANDSTONE CORE

| Fluid | Fluid Loss Control Additive (gals/mgal) | Total Fluid Loss After 1 Hour (ml/cm$^2$) |
|---|---|---|
| Sample Fluid No. 3 (DELTA FRAC ® 140 25 Fluid System) | 0 | 1.83 |
| Sample Fluid No. 4 (DELTA FRAC ® 140 25 Fluid System) | 67 | 1.16 |

Figure 9:
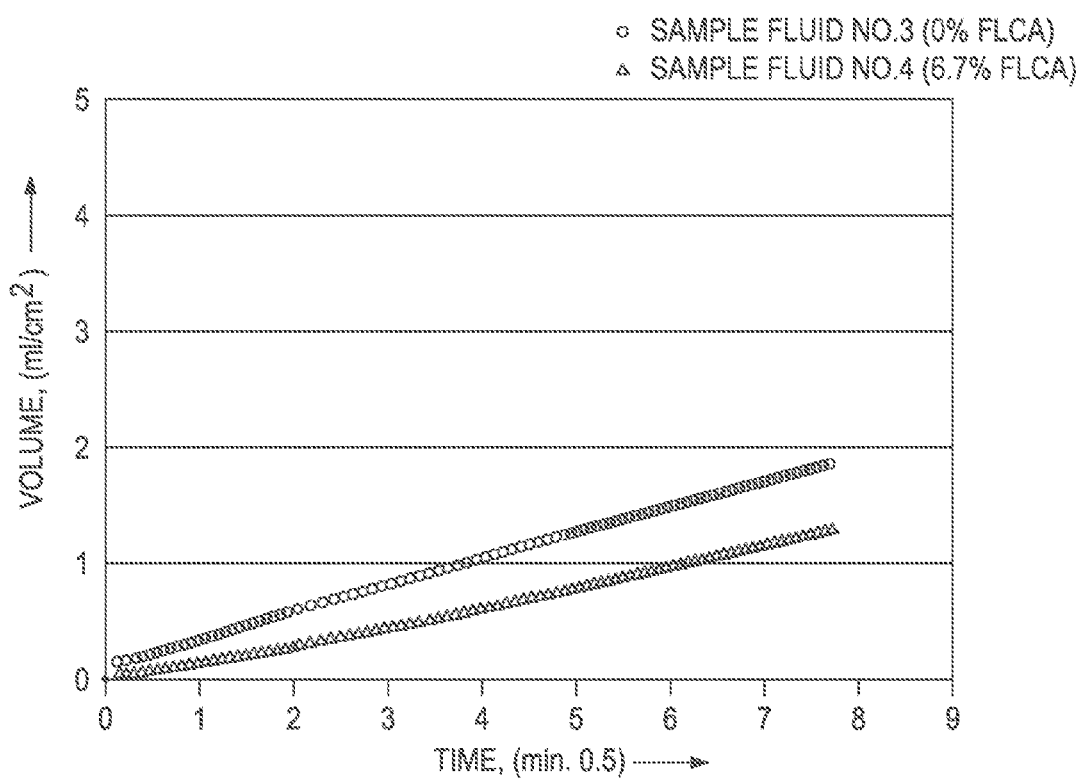
FIG. 9 is a plot of fluid loss volume per time for a dynamic fluid loss test performed using a round cell containing an Ohio sandstone core and various sample fluids.

Dynamic fluid loss control tests (Test No. 11) were conducted in accordance with the above procedure using the Ohio sandstone core sample for both Sample Fluid No. 3 and Sample Fluid No. 4. Table 10 below lists the total fluid loss volume after 1 hour for each sample. The results of this test are also depicted in FIG. 9.

TABLE 10

OHIO SANDSTONE CORE

| Fluid | Fluid Loss Control Additive (gals/mgal) | Total Fluid Loss After 1 Hour (ml/cm$^2$) |
|---|---|---|
| Sample Fluid No. 1 (DELTA FRAC ™ 25 Fluid System) | 0 | 1.84 |
| Sample Fluid No. 2 (DELTA FRAC ™ 25 Fluid System) | 67 | 1.33 |

Accordingly, this Example illustrates that the fluid loss control additives useful in the present invention may be suitable for providing dynamic fluid loss control in a variety of formation rock types and fluid systems.

Example 9

Fluid loss control tests (Tests Nos. 12-13) were performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined as the "production direction," fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation. Two treatment solutions were prepared for this series of tests.

The following procedure was used for this series of tests. For each test, the core experienced a flow sequence of 1) brine, 2) oil (kerosene), 3) drilling mud (to build a filter cake), and 4) sample treatment fluid. The first flow step, brine, was in the production direction and prepared the core for the test. The brine used in the first flow step was a brine containing 7% potassium chloride by weight. Next, in the second flow step, the kerosene was flowed in the production direction at a constant rate until the pressure stabilized. Thereafter, in the third flow step, a sample drilling mud was placed in the hollow interior of the core and pressure was applied, such that a drilling fluid filter cake was formed on the inner surface of the core. After formation of the drilling fluid filter cake, the sample treatment fluid was placed in the inner hole, and a constant pressure of 120 psi was applied. The filtrate loss from the sample treatment fluid was then measured as a function of time.

Figure 10:
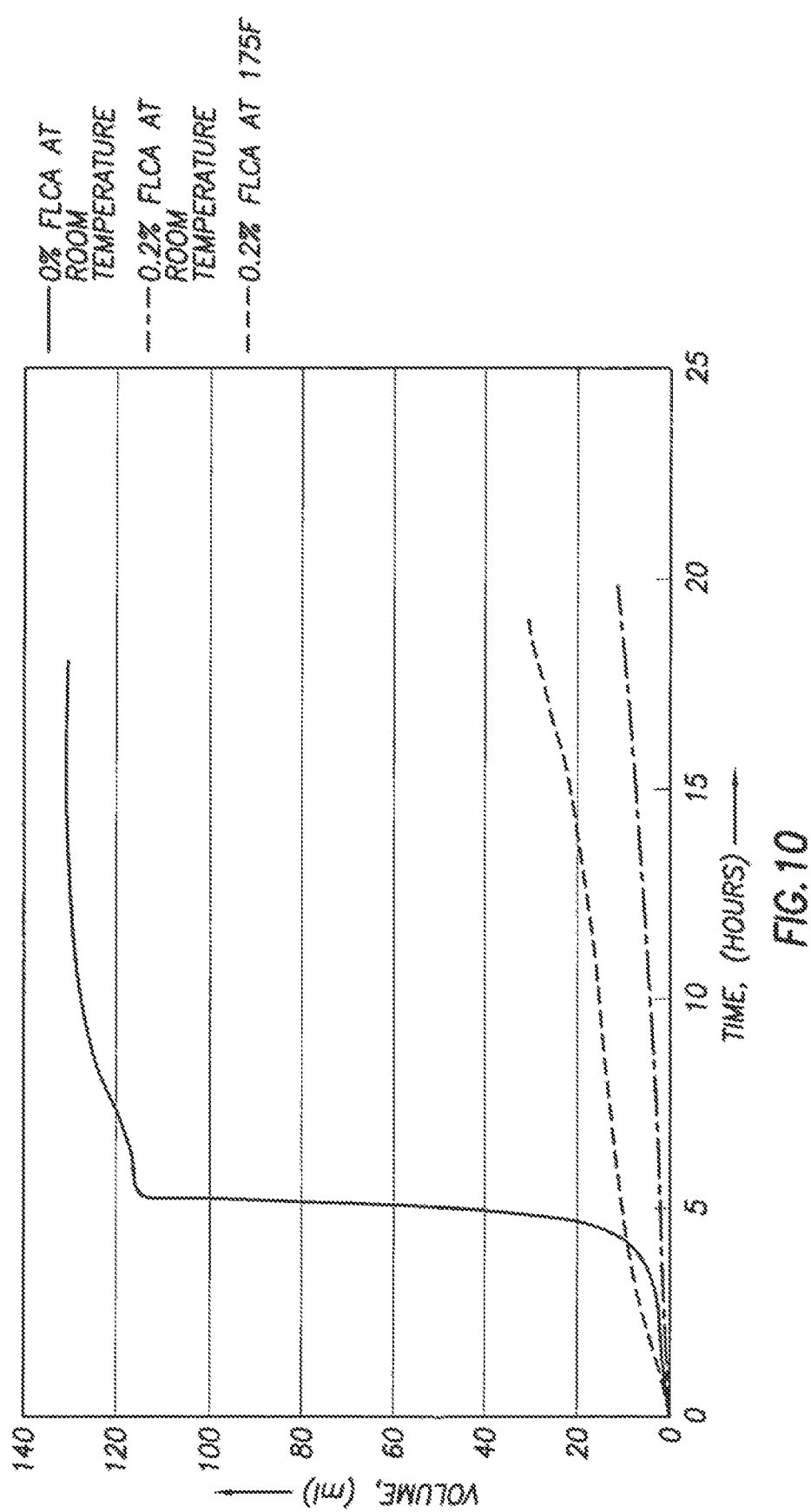
FIG. 10 is a plot of fluid loss volume versus time for a fluid loss test performed using Berea sandstone core and various sample fluids.

The sample treatment fluid used in Test No. 12 was prepared by adding 0.2% by weight of a fluid loss control additive to an aqueous fluid that comprised 10% acetic acid by weight and 1% HC-2 by weight. HC-2 is an amphoteric surfactant from Halliburton Energy Services, Inc. The fluid loss control additive was a dimethylaminoethyl methacrylate/hexadecyl-dimethylammoniumethyl methacrylate copolymer prepared as described in Example 3. Test No. 12 was performed using this fluid at room temperature and at 170° F. Test No. 12 was also performed using this sample treatment fluid that comprised 10% acetic acid by weight and 1% HC-2 by weight without the fluid loss control additive. The results of Test No. 12 are provided in FIG. 10.

Figure 11:
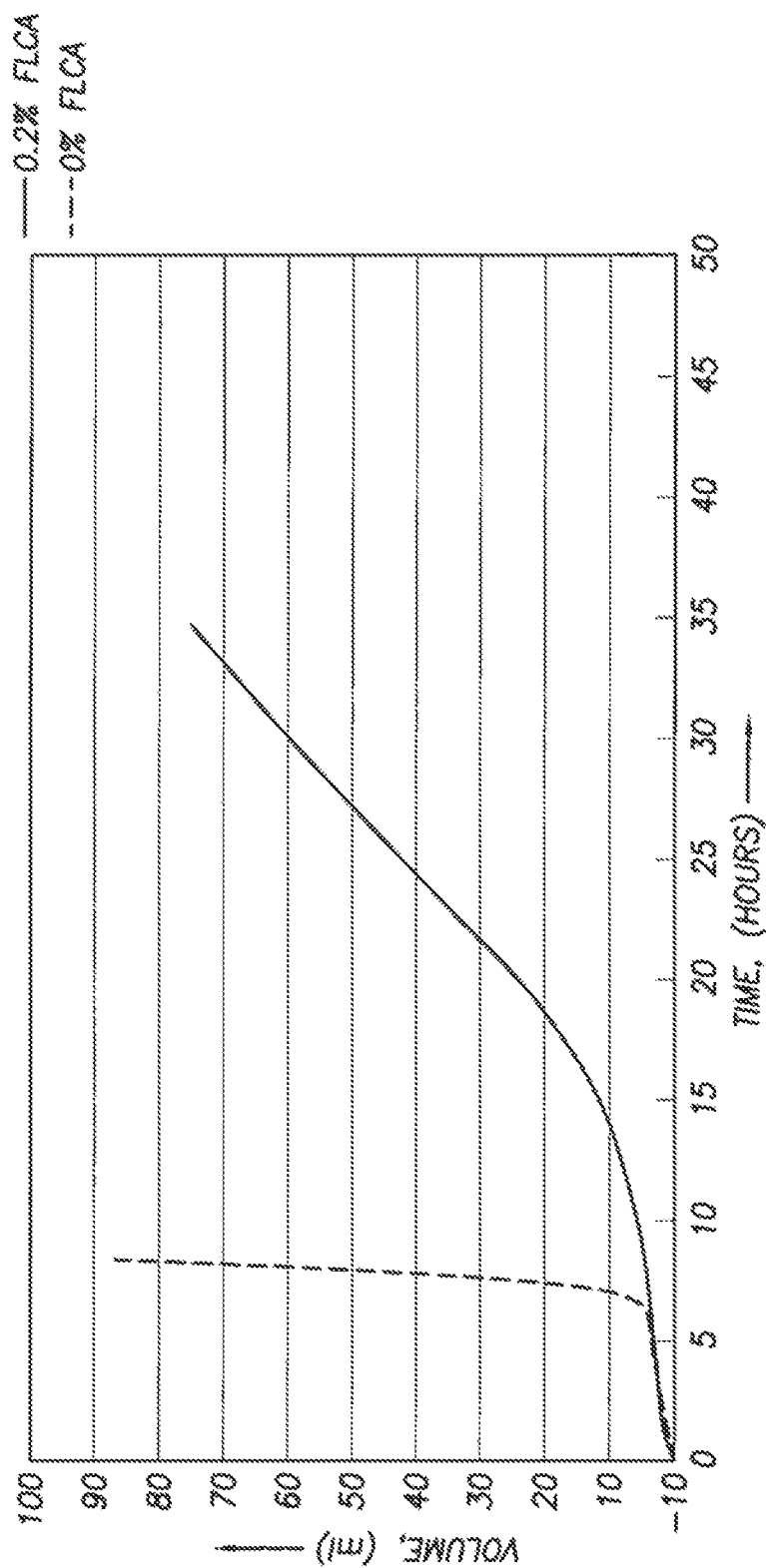
FIG. 11 is a plot of fluid loss volume versus time for a fluid loss test performed using a Berea sandstone core and various sample fluids.

The sample treatment fluid used in Test No. 13 was prepared by adding 0.2% by weight of a fluid loss control additive to a 21% by weight KCl brine. The fluid loss control additive was a dimethylaminoethyl methacrylate/hexadecyl-dimethylammoniumethyl methacrylate copolymer prepared as described in Example 3. Test No. 13 was performed using this fluid at room temperature. This test was repeated using the 21% KCl brine without the fluid loss control additive. The results of Test No. 13 are provided in FIG. 11.

Accordingly, this Example illustrates that the fluid loss control additives useful in the present invention may be suitable for providing fluid loss control.

Example 10

Fluid loss control test (Test No. 14) was performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined as the "production direction," fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation.

The following procedure was used for this series of tests. For each test, the core experienced a flow sequence of 1) brine, 2) oil (kerosene), 3) drilling mud (to build a filter cake), and 4) sample treatment fluid. The first flow step, brine, was in the production direction and prepared the core for the test. The brine used in the first flow step was a brine containing 7% potassium chloride by weight. Next, in the second flow step, the kerosene was flowed in the production direction at a constant rate until the pressure stabilized. Thereafter, in the third flow step, a sample drilling mud was placed in the hollow interior of the core and pressure was applied, such that a drilling fluid filter cake was formed on the inner surface of the core. After formation of the drilling fluid filter cake, the cell was opened up and packed with 40/60 mesh sand. Thereafter, the sample treatment fluid was placed in the inner hole, and a constant pressure of 120 psi was applied. The filtrate loss from the sample treatment fluid was then measured as a function of time.

Figure 12:
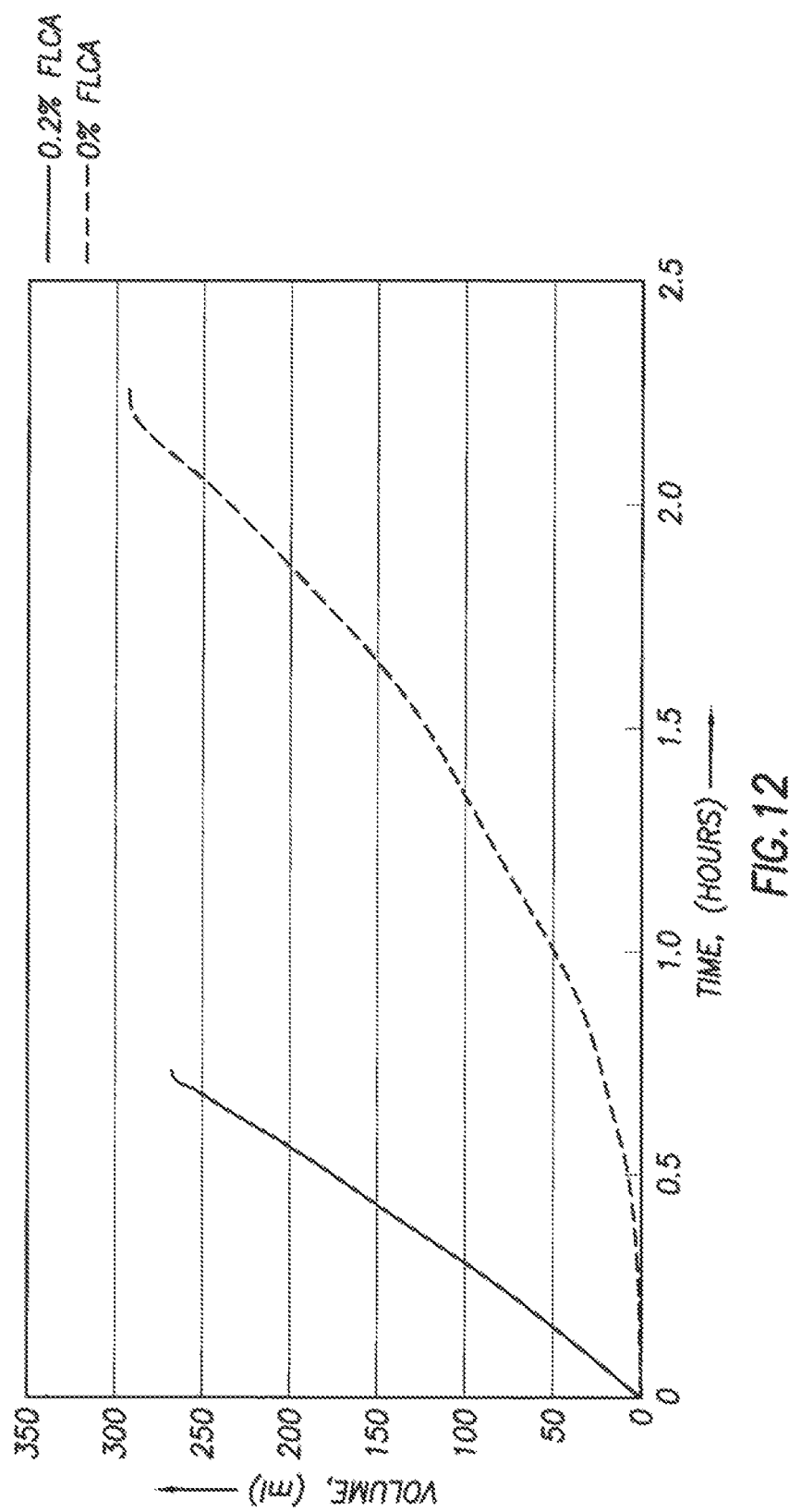
FIG. 12 is a plot of fluid loss volume versus time for a fluid loss test performed using a Berea sandstone core and various sample fluids.

The sample treatment fluid used in Test No. 14 was prepared by adding 0.2% by weight of a fluid loss control additive to an aqueous fluid that comprised 10% acetic acid by weight and 1% HC-2 by weight. The fluid loss control additive was a dimethylaminoethyl methacrylate/hexadecyl-dimethylammoniumethyl methacrylate copolymer prepared as described in Example 3. Test No. 14 was performed using this fluid at 170° F. This test was repeated using this sample treatment fluid that comprised 10% acetic acid by weight and 1% HC-2 by weight without the fluid loss control additive. The results of Test No. 14 are provided in FIG. 12.

Accordingly, this Example illustrates that the fluid loss control additives useful in the present invention may be suitable for providing fluid loss control.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims. The terms in the claims have their plain, ordinary meaning unless otherwise defined by the patentee.

What is claimed is:

1. A method of controlling fluid loss in a subterranean formation comprising:
   providing a treatment fluid comprising an aqueous fluid and a fluid loss control additive, the fluid loss control additive comprising a hydrophilically modified water-soluble polymer comprising a reaction product of a hydrophilic compound and a hydrophilic polymer;
     wherein the hydrophilic compound is selected from the group consisting of: a polyether comprising a halogen, a sulfonate, a sulfate, an organic acid, an organic acid derivative, and a combination thereof;
     wherein the hydrophilic polymer is selected from the group consisting of: a polyvinylamine, a poly(vinylamine/vinyl alcohol), and a combination thereof;
   introducing the treatment fluid into a portion of a subterranean formation wherein the hydrophilically modified water-soluble polymer reduces the permeability of the portion of the subterranean formation to aqueous fluids without substantially reducing the permeability to hydrocarbons so that fluid loss from the aqueous fluid into the portion of the subterranean formation is reduced.

2. The method of claim 1 wherein pressure in the interval of the well bore is overbalanced, and the treatment fluid contacts the subterranean formation so as to create one or more fractures therein.

3. The method of claim 1 wherein the treatment fluid is introduced into the interval of the well bore at a pressure sufficient to at least substantially displace formation fluid from the well bore.

4. The method of claim 1 wherein the step of introducing the treatment fluid into a portion of a subterranean formation occurs after creating one or more perforations in the interval of the well bore, wherein the perforations extend from the well bore and into the subterranean formation.

5. The method of claim 4 wherein the step of creating one or more perforations utilizes a perforating gun, a laser perforating device, a chemical perforating device, or a hydraulic jetting device.

6. The method of claim 4 wherein the step of creating the one or more perforations creates a dynamic underbalance in the interval of the well bore.

7. The method of claim 1 further comprising the step of:
introducing an oxidizer into the interval of the well bore so as to contact the portion of the subterranean formation, subsequent to the step of allowing the treatment fluid to contact the portion of the subterranean formation.

8. The method of claim 1 wherein the hydrophilically modified water-soluble polymer comprises a polymer backbone comprising a reactive amino group.

9. A method of controlling fluid loss in a subterranean formation comprising:
providing a treatment fluid comprising an aqueous fluid and a fluid loss control additive, the fluid loss control additive comprising a hydrophilically modified water-soluble polymer comprising a reaction product of a hydrophilic compound and a hydrophilic polymer;
wherein the hydrophilic compound is selected from the group consisting of: a polyether comprising a halogen, a sulfonate, a sulfate, an organic acid, an organic acid derivative, and a combination thereof;
wherein the hydrophilic polymer is a polysulfone;
introducing the treatment fluid into a portion of a subterranean formation wherein the hydrophilically modified water-soluble polymer reduces the permeability of the portion of the subterranean formation to aqueous fluids without substantially reducing the permeability to hydrocarbons so that fluid loss from the aqueous fluid into the portion of the subterranean formation is reduced.

10. The method of claim 9 wherein pressure in the interval of the well bore is overbalanced, and the treatment fluid contacts the subterranean formation so as to create one or more fractures therein.

11. The method of claim 9 wherein the treatment fluid is introduced into the interval of the well bore at a pressure sufficient to at least substantially displace formation fluid from the well bore.

12. The method of claim 9 wherein the step of introducing the treatment fluid into a portion of a subterranean formation occurs after creating one or more perforations in the interval of the well bore, wherein the perforations extend from the well bore and into the subterranean formation.

13. The method of claim 12 wherein the step of creating one or more perforations utilizes a perforating gun, a laser perforating device, a chemical perforating device, or a hydraulic jetting device.

14. The method of claim 12 wherein the step of creating the one or more perforations creates a dynamic underbalance in the interval of the well bore.

15. The method of claim 9 further comprising the step of:
introducing an oxidizer into the interval of the well bore so as to contact the portion of the subterranean formation, subsequent to the step of allowing the treatment fluid to contact the portion of the subterranean formation.

16. The method of claim 9 wherein the hydrophilically modified water-soluble polymer comprises a polymer backbone comprising a polar heteroatom.

* * * * *